April 23, 1968
R. J. LIPINSKY
3,379,139
METHOD AND APPARATUS FOR QUANTITY PRODUCTION
OF UNBAKED FOLDED PASTRIES
Filed Sept. 30, 1965
4 Sheets-Sheet 1
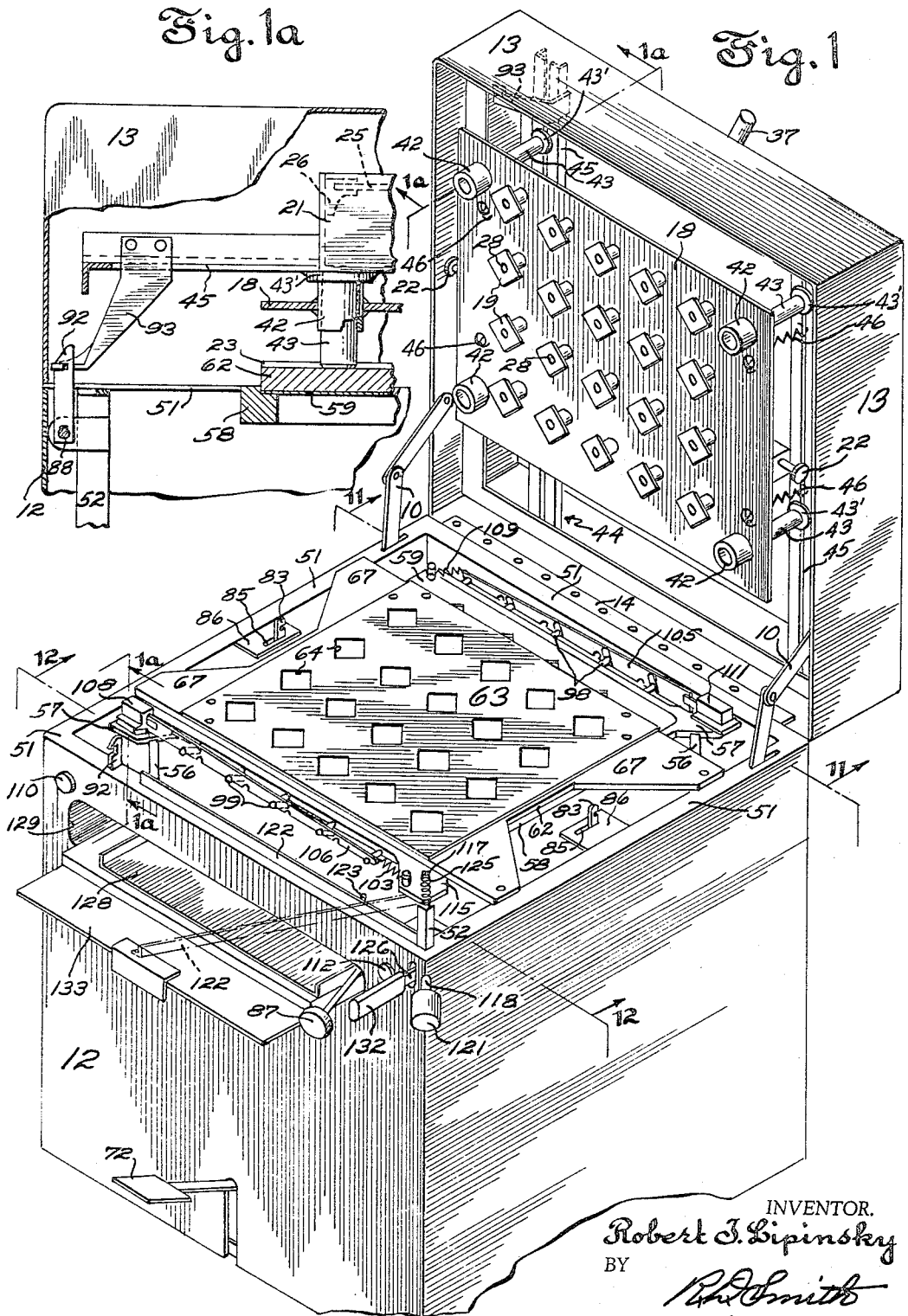
INVENTOR.
Robert J. Lipinsky
BY
Rob Smith
ATTORNEY

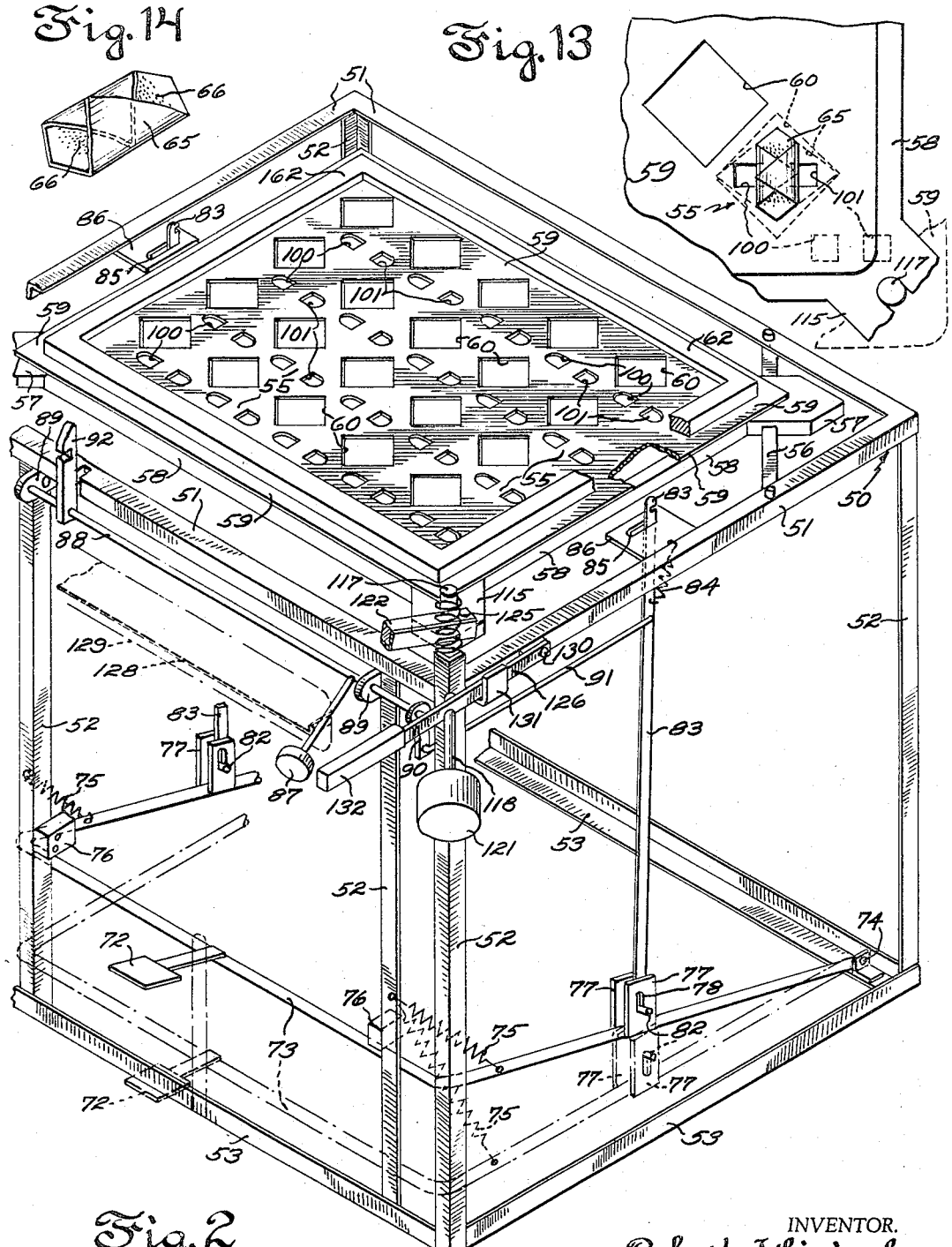

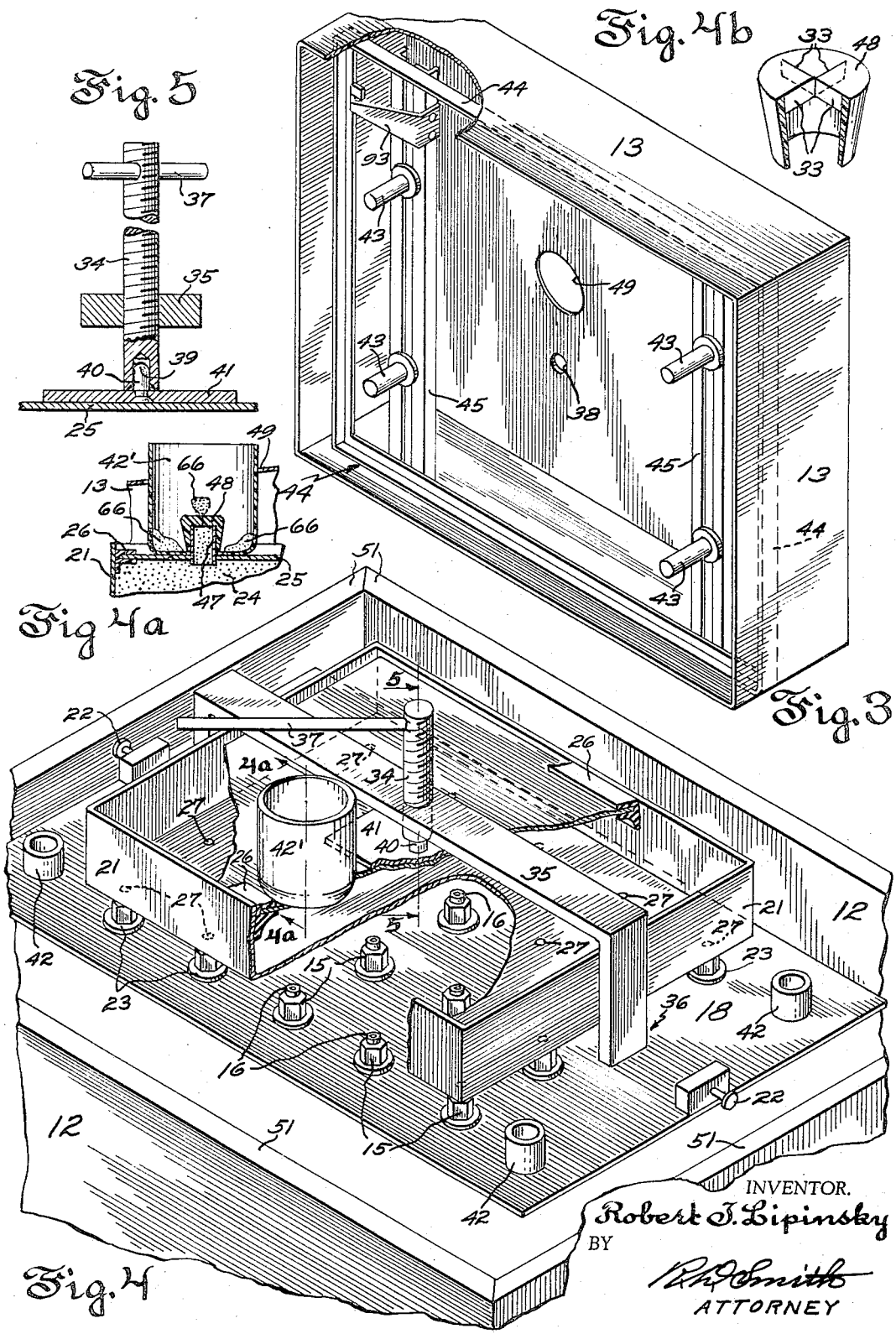

April 23, 1968 R. J. LIPINSKY 3,379,139
METHOD AND APPARATUS FOR QUANTITY PRODUCTION
OF UNBAKED FOLDED PASTRIES
Filed Sept. 30, 1965 4 Sheets-Sheet 4
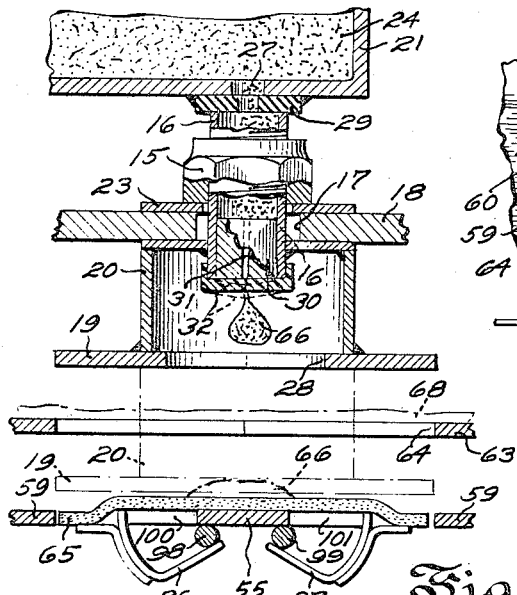
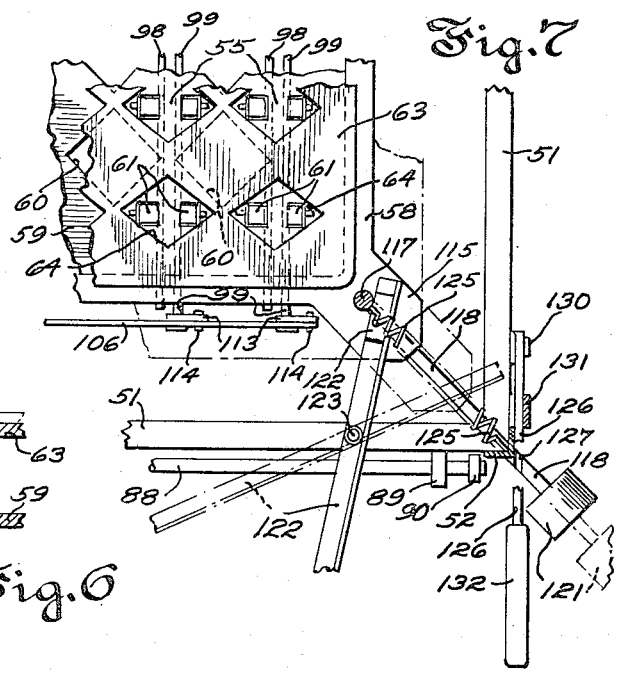
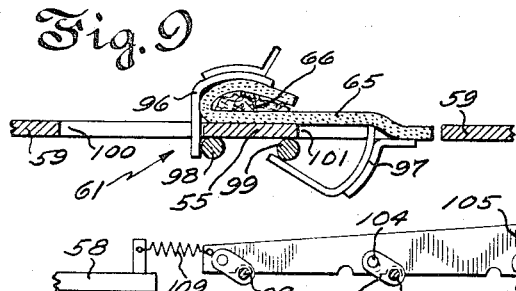
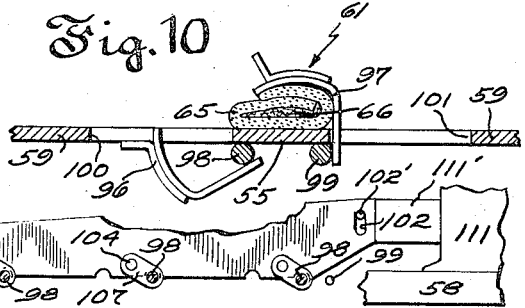
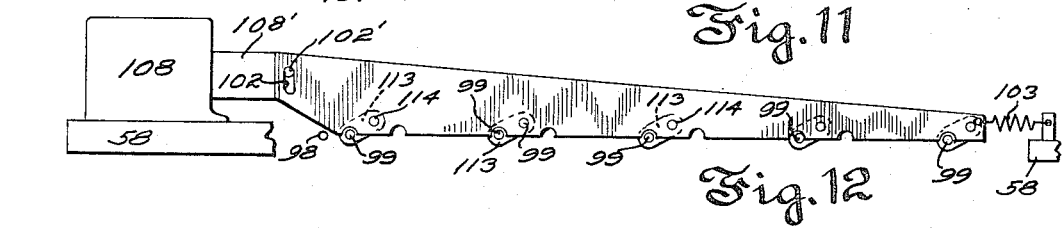
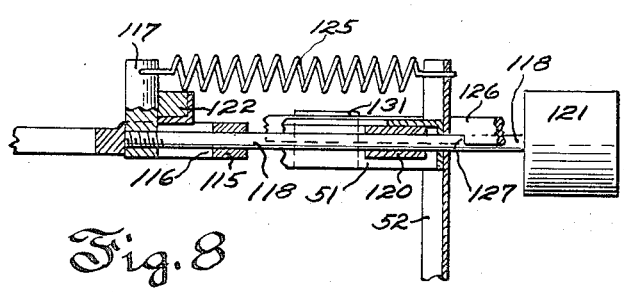
INVENTOR.
Robert J. Lipinsky
BY
ATTORNEY

United States Patent Office

3,379,139
Patented Apr. 23, 1968

3,379,139
METHOD AND APPARATUS FOR QUANTITY PRODUCTION OF UNBAKED FOLDED PASTRIES
Robert J. Lipinsky, 86 Buddington Road, Huntington, Conn. 06484
Filed Sept. 30, 1965, Ser. No. 491,781
13 Claims. (Cl. 107—1)

ABSTRACT OF THE DISCLOSURE

Unitary cabineted apparatus for converting a sheet of pastry dough into a production quantity of separate unbaked pastry blanks or the like incorporating a filler ingredient separately enfolded by each dough blank, and discharging such quantity of folded pastry blanks simultaneously from the apparatus for conveyance to a bake oven. Also a method of sequentially producing, treating and assembling such folded blanks and feeding the filler ingredient thereto that can be practiced with the aid of such apparatus. In such method the unitary blanks are first punched simultaneously from the sheet of dough, then provided simultaneously with deposits of the filler ingredient, then enfolded simultaneously about such deposits of ingredient, and next discharged for baking by snap action of the apparatus that permits all the blanks to drop away simultaneously from their means of support.

Brief summary of the invention

This invention relates to improved methods of producing from a sheet of pastry dough and a supply of filler ingredient a folded pastry blank comprising a flat blank of the dough punched from said sheet and then folded so as to encompass at least partially a filling of the said ingredient in condition for transfer to a bake oven.

The invention relates also to apparatus helpful in performing the improved method particularly where miniature Danish pastries are the end product and where such pastries are to be produced in large quantities on a commercial basis.

Heretofore the process of making such pastries has involved piece-by-piece craftsmanship practiced by manipulating the raw dough by the fingers of an operator's hands. Such is a slow and relatively inefficient process resulting in high labor cost and consequently a high retail price which has long restricted the market for this popular kind of delicacy.

An object of the presently improved method is to increase the uniformity and speed with which pre-shaped flat blanks of dough can be manipulated in a manner to enfold a filler ingredient, and particularly by depositing the blank on an apertured bed plate with marginal portions of the blank overlapping the apertures in the bed plate, and then reaching upward through such in an arcuate path whereby to flex said marginal portion or portions into overlapping relation to the remainder of the blank of dough so as to wrap therewithin whatever additive of filler ingredient may have been deposited on the flat blank.

An object of the presently improved apparatus is also to produce simultaneously and rapidly from an integral sheet of pastry dough multiple quantities of pastry blanks, each enfolding a filler ingredient as above described.

For this purpose it is a further object of the improved apparatus to perform a succession of pastry blank preparing steps within a sanitary enclosure without dependence on visual observation of the operations being performed.

Also to cut out simultaneously from an integral sheet of dough, multiple pieces of the dough by means of hollow punches through which filler ingredient can be deposited on the dough pieces.

Also to enfold deposits of filler ingredient within all of the dough pieces simultaneously in a manner to produce a multiplicity of pastry blanks resting on a common bed plate in a predetermined pattern of relative positions.

Also to discharge all of said pastry blanks simultaneously from the common bed plate preferably into a common pan for transfer together to a bake oven.

An example of a successfully operative apparatus, with controls for successive manual actuations thereof from the exterior of its cabinet enclosure, is explained more particularly in the following description having reference to the accompanying drawings wherein:

FIG. 1 is an outside isometric view of a complete pastry making machine embodying the invention with cover of the machine open.

FIG. 1a is an enlarged fragmentary view taken in section on the planes 1a—1a—1a—1a in FIG. 1 with the cover locked in closed position.

FIG. 2 is an enlarged view of the body portion of the machine with the die plate broken away to expose the bed plate, the casing being stripped from the machine to expose the underlying mechanisms and framework with folder mechanism omitted.

FIG. 3 is a view of the cover as in FIG. 1 with the die plate removed.

FIG. 4 is an isometric view looking at the top surface of the punch plate when removed from the cover of the machine and shows a dispensing container for pastry filling material located between the punch plate and the top wall of the casing cover.

FIG. 4a is a view in section on the plane 4a—4a in FIG. 4 showing a sight feed device by means of which each quantity of discharge of filler ingredient from its container can be gaged visually.

FIG. 4b is an enlarged perspective cut-away view of the ooze restraining grommet diaphragm shown in FIG. 4a.

FIG. 4b is a fragmentary view taken in section through the filler extruding screw on the plane 5—5 in FIG. 4.

FIG. 6 is an enlarged and fragmentary view taken in section on the plane 6—6 in FIG. 7, looking in the direction of the arrows.

FIG. 7 is a plan view of a corner of the machine showing a cock-and-fire mechanism for shifting the bed plate horizontally in oblique relation to the rectangular framework with abrupt action for discharging the folded pastry blanks.

FIG. 8 is a section taken on the plane 8—8 in FIG. 7, looking in the direction of the arrows.

FIG. 9 shows the flipper mechanism parts of FIG. 6 as positioned after the first folding operation.

FIG. 10 shows the same parts as positioned after the second folding operation of the flipper mechanism.

FIG. 11 is an elevation of parts of the rear flipper actuating mechanisms viewed from the plane 11—11 in FIG. 1.

FIG. 12 shows the actuating parts for the front flipper mechanism viewed from the plane 12—12 in FIG. 1.

FIG. 13 is a plan view of a filled and folded pastry blank and its adjacent discharge aperture in the bed plate indicating in broken lines movement of the latter for discharging all the unbaked pastry blanks simultaneously from the bed plate to make them available for transfer to a bake oven in unison.

FIG. 14 is a perspective view of the ultimate product of the present improvements in method and apparatus.

The drawings show a Danish pastry making machine that embodies the invention and which is useful in practicing the method of the invention.

The machine is preferably of the cabinet type and of suitable height to stand on the floor with its controls positioned to be reached conveniently by an operator standing in front of the machine which faces the left in FIGS. 1, 2 and 4.

The outer casing of the body section of the machine is designated 12. The corresponding casing of the liftable cover is designated 13 and it is hinged to the body casing at 14 so that the cover can be swung upwardly to its open position shown in FIG. 1. When the cover is closed the bottom edges of its casing abut the top edges of the body casing making a sealed compartment within which the food material to be worked upon is enclosed during its processing by the machine. Conventional hinged toggle type braces 10 yieldably stay the cover in open position.

The internal working parts of the machine are carried partly by the cover 13 and partly by the body 12 and comprise two flat, plate-like members of sizable expanse whose broadside surfaces approach and recede from each other in the operation of the machine. The construction of these members with their associated equipment will next be described.

One of said members 18 is carried movably to reciprocate up and down within cover 13 and is termed the punch plate. It carries the cutter punches 19 which have center openings 28 and are fixedly attached to the bottom surface of plate 18 so as to depend therefrom. As shown in FIG. 6 each of the shanks 20 of the punches 19 is hollow and through an opening 17 in plate 18 has passageway communication with the space above the plate by means of a short tubular nipple 16 which is externally screw threaded and welded to the punch shank as shown in FIG. 6. A nut 15 engages the screw threads on nipple 16 at the top face of punch plate 18 and draws the punch shank upward firmly against the plate by bearing on a spacer washer 23. The bottom end of nipple 16 is partially closed by a plug 30 providing the passageway restricting orifice 31. The bottom end of nipple 16 is also capped by a grommet 32 having a resilient diaphragm of rubber or other suitable material cross slit as at 33 in the manner of the grommet shown in FIG. 4b and spanning the bottom end of nipple 16 to restrain unwanted oozing of the filler ingredient from the latter. On the top ends of the combined punch shanks 20 there rests a shallow dispensing pan 21 adapted to contain the filling material 24 to be incorporated in the pastry blanks before their discharge from the machine ready to be baked. Reference is next made to FIG. 4 where pan 21 is located by lateral guides not shown.

Resting on the top surface of the filling material contained in pan 21 there is an extruder plate 25 whose edges are beaded with a sealing strip 26 of soft resilient material that wipes slidably against all internal surfaces of the sides of pan 21 whereby to confine the filling substance against escape between strip 26 and the sides of the pan when said plate 25 is forced downward. This exerts an equalized pressure on the filling material which causes it to be extruded downward and in equal amounts through all orifices 27 in the bottom of the pan simultaneously. These orifices are aligned respectively with the upper ends of the aforesaid nipples 16. In FIGS. 4 and 6 it is shown that the top end of each of said nipples constantly rests on a relatively soft gasket washer 29 fixed to pan 21. When the filling material is subjected to the thrusting action of extruder plate 25 by the impulsion of a screw threaded rod 34 the abutment of nipples 16 against washers 29 is separably maintained by the holding down action of yoke 36 and/or other suitable holding down means to form a continuous sealed passageway for the filler ingredient from pan 21 to grommet 32. The rod 34 has screw threaded engagement with cross bar 35 of the aforesaid rigid yoke 36 that is fixedly carried on and upstands from the cutter plate 18 so as to bridge over pan 21. Thrust rod 34 bears downwardly on the rounded top head 39 of a short stud 40 that upstands fixedly from a presser plate 41 atop the upper surface of extruder plate 25. Rod 34 is turnable by means of a removable crank handle 37. A clearance hole 38 in cover casing 13 permits the screw post 34 to extend upward freely therethrough.

Punch plate 18 fixedly carries four or more weld attached tubular slide bearings 42 which project from both broadside faces of the plate to be guided for reciprocative movement relative to the cover 13 by four frame posts 43. Each of these posts is rigid with and projects from a mounting disc 43' welded on the skeleton framework 44 of the cover which comprises an assemblage of channel irons 45 and abuts and stiffens the side walls of cover casing 13. Punch plate 18 also carries fixedly at the opposite side edges thereof laterally projecting studs 22 positioned to be engaged and pulled vertically downward by operating mechanism located in the body section of the machine cabinet. Four contractile spring coils 46 stretched between the anchorages of their ends respectively to punch plate 18 and channel irons 45 yieldably hold punch plate 18 in uppermost position determined by the abutment of its slide bearings 42 against the mounting discs 43' on irons 45 of the cover framework.

The body section of the machine comprises inside of its casing 12 a rigid framework 50 composed of welded together channel irons, some hereinafter designated by separate and different reference numerals for convenience of reference. The aforesaid top edges of the body casing 12 are made rigid by a rectangular assemblage of the channel irons 51 supported by upright channel irons 52 whose bottom ends are fixedly spaced and rigidly connected by base channel irons 52 which rest on the floor. The interior of the body casing 12 is hollow and mostly vacant except for operating mechanism hereinafter described.

Two diagonally opposite corners of the space bordered by framework 50 formed by the meeting of top edge irons 51 are spanned by diagonal rails 56 forming horizontal tracks along which there are slidable edgewise for a short distance the corner flanges 57 of a rigid, rectangular, horizontal border frame 58 that supports and is spanned by a relatively thin bed plate 59 whereby to form an edgewise shiftable table. Plate 59 has drop-out apertures 60 through which are simultaneously discharged pastry blanks that are first folded by mechanisms 61 at folding stations 55 located intermediate apertures 60 and whose details are hereinafter described. The upper surface of bed plate 59 in turn supports on its margins a rectangular empty rigid marginal wall 62 surrounding the central area of the bed plate. Bed plate 59 with its marginal wall 62 underlies and is slidable diagonally relatively to a stationary die plate 63 (see FIG. 1) having apertures 64 that are in vertical register with and just above the respective underlying folding station 55 in the stroke path of the superposed punches 19 aforesaid. Die plate 23 is removably stationed on the body of the machine by mounting flanges 67.

It will appear hereinafter that when a sheet of dough 68 for making pastries is laid on the die plate 63 so as to cover die apertures 64, swatches of the dough can be cut from the sheet simultaneously when punches 19 are stroked downward through the closely fitting apertures 64 in die plate 63, whereby these swatches or food blanks come to rest on the bed plate 59, each swatch overlying two apertures 100 and 101 in the bed plate located just above the folding mechanisms 61 at folding stations 55 in FIG. 6.

FIGS. 1 and 2 show mechanism for alternately stroking downward and then releasing to the lifting action of the aforesaid springs 46 the punch plate 18, such mechanism including a foot pedal 72 appearing in FIGS. 1 and 2 to be accessible at the front of the base of the machine. Pedal 72 projects from a U-shaped rocker bail 73 whose rearward extending arms are hinged at 74 to the rear floor iron 53 of the body frame. FIG. 2 shows that the pedal and bail are normally uplifted by springs 76 stretched to an anchorage point on the upright irons 52 of the body frame. The upward swing of the bail is limited by stops 76.

Approximately midway the lever arm length of each side of bail 73 there is carried rigidly by the bail two upstanding spur brackets 77 each with a vertically elongated aperature 78 in which rides a follower stud 82 fixed in the bottom end of a tubular vertical pull link 83 so as to project laterally therefrom. The top ends of links 83 are shown to be notched into hook formation for operative engagement respectively with the hereinbefore mentioned projecting studs 22 on the edges of cutter plate 18. Link 83 is normally urged to sway into such engagement by a spring 84 connecting the link to a top iron 51 of the body frame. At its top end the link is free to ride in a horizontal guide slot 85 in frame bracket 86 fixed on the frame iron 51 thus to swing into and out of engagement with studs 22. The links are disengageable from these studs simultaneously as follows. By pulling up on a handle 87 a shaft 88 is turned in its corner frame bearings 89 and its fixedly carried crank arm 90 is coupled to link 83 by a pull wire 91 to overcome spring 84 and disengage links 83 from studs 22. The same throw of handle 27 swings the cover latch 92 about shaft pivot 88 out of interlocking engagement with the catch 93 carried fixedly on the cover frame iron 45 by overcoming the latching bias of spring 84 so the cover can be opened.

In the action of the parts just described the ability of link stud 82 to ride in the slots 78 in bail bracket 77 enables the downward thrust on the bail to pickup momentum before studs 82 strike the bottom ends of the slots 78 which quickens the abruptness of movement of the cutting punches before they contact the sheet of dough that is to be severed thereby.

As will appear hereinafter, when the food blanks 65 are resting on the bed plate 59 a small amount of the filling material in pan 21 can be extruded downward and will pass simultaneously through all of outlet holes 28 in the cutting punches 19 by turning screw handle 37 so that the extruded charges 66 of filling material drop simultaneously onto all of the food blanks for being wrapped respectively therein by folding action of mechanisms hereinafter described with particular reference to FIGS. 6, 7, 10 and 11. For visually gaging the amount of each charge of filler ingredient deposited on the sight concealed dough blanks 65 at each turning of the screw post 34 there is provided the pilot cup 42' shown in FIGS. 4 and 4a to be fixed on the top surface of extruder plate 25. A hole 49 in cover 13 enables cup 42' to protrude upward therethrough. Both the bottom of the cup and the extruder plate are penetrated by a vertical conduit nipple 47 giving flow communicating between the filler ingredient stored in pan 21 and the interior of cup 42'. The otherwise open top end of nipple 47 is capped by a grommet 48 of resilient flexible material such as rubber having a diaphragm portion spaning the top of the nipple. This diaphragm portion is cross slit at 33 to permit passage upward through bonnet 47 of the same amount of filler ingredient that passes downward through each of the bonnets 32 responsively to the same pressure impulse of the extruder plate on the ingredient confined in pan 21. Automatic closing of the slits restraints unwanted outward oozing of the ingredient between pressure impulses. Thus there can be observed while turning the expelling screw 34 how much filler ingredient is being deposited on each dough blank 65 and this serves as a sight guide or visible pilot by which to judge how much turning to give to the screw 34. Between each dispensing operation the gob filler ingredient which exudes to the top of the grommet can be scraped off into the bottom of the pilot cup. Grommet 48 has a sufficiently strong cling to the nipple 47 to hold the cup 42' downward in place against the extruder plate.

In FIGS. 6, 9 and 10 the parts of a typical flipper mechanism comprise angular folder arms 96 and 97 fixed respectively on shafts 98 and 99 which are journaled in the front and rear spans of the border frame 58 that carries the bed plate 59 of the shiftable table. Folder arms 96 and 97 lie respectively under apertures 100 and 101 in the bed plate and by turning in unison with their respective shafts 98 and 99 are caused to swing upward in an arcuate path individually and sequentially through their respective aperatures and are then immediately and sequentially withdrawn to their lowermost starting positions, below the bed plate.

For so operating folder arms 96, the shafts 98 are all turned clockwise in FIG. 9 approximately 120° in unison by lengthwise reciprocation toward the right of a gang pitman 105 (FIG. 11) paralleling the rear edge of the bed plate 59 and are then restored by reverse movement of the pitman under pull of the spring 109. After that, shafts 99 are correspondingly turned counterclockwise in unison in FIG. 10 an equal number of degrees by the lengthwise shifting toward the left in FIG. 12 of another pitman 106 paralleling the front edge of the bed plate. The consequent wrapping of the filling material within the folds of the dough blank is indicated in FIGS. 9 and 10. Pitman 106 and hence shafts 99 are returned by spring 103.

The rear ends of shafts 98 have fixed thereon crankarms 107, the swingable ends of which are pivotally engaged at 114 with the rear pitman 105 and swung clockwise thereby as described so that abrupt shifting of pitman 105 lengthwise toward the right under the pull of solenoid 111 in FIGS. 1 and 11 turns shafts 98 clockwise in FIG. 9 and performs the initial folding of the dough blank. Pitman 105 is then restored toward the left by spring 109 anchored on bed plate 59 when solenoid 111 is electrically deenergized. It is electrically energized and deenergized in its proper sequence of action in the cycle of machine operation by manually pressing and releasing a push button electric switch 110. A separate solenoid 108 draws the aforesaid front pitman 106 toward the left when energized by a different push button electric switch 112 and by means of crankarms 113 fixed respectively on shafts 99 and pivotally connected to pitman 106 at 104 swings the folder arms 97 counterclockwise to perform the final folding of the dough blank as shown in FIG. 10. Pitman 106 is returned toward the right in FIG. 12 by spring 103 when solenoid 108 is deenergized. Spring 103 is anchored on bed plate 59. The lengthwise reciprocation of pitmans 105, 106 necessarily takes place in an arc owing to the swing of crank arms 107, 113 and the arcuate path of travel of the pitmans is accommodated by the vertical slot 102 in each pitman engaged slidably by a pin 102' in the respective armatures 108', 111' of the solenoids.

The purpose of abruptly jerking the border frame 58, and thereby the slidable bed plate 59, diagonally in a horizontal plane on its supporting rails 56 is to discharge the completely folded pastry blank from the bed plate 59 onto a underlying bake pan 128 that is insertable into and removable from the cabinet of the machine body through a front opening 129. See FIG. 1. For this purpose there is provided a strong, spring powered, cock-and-fire mechanism best shown in FIGS. 7 and 8. Removal of pin 128 is aided by slidable shelf 133.

The aforesaid slidable border frame 58 that carries the bed plate 59 has a projecting flange 115 at a right front corner thereof containing an elongate slot 116 of preferably rectangular cross section in which rides an impelling stud 117 upstanding above flange 115 and joined to a weight carrying rod 118 that threads into stud 117 and has a horizontal slide bearing in flange 115 of the slidable bed frame 58. Rod 118 also has a slide bearing in a spur bushing 120 welded onto the upright frame iron 52 which has a clearance hole permitting rod 118 to project cornerwise outward from the casing of the machine where it carries an inertia providing weight 121. A cocking lever 122 is pivoted on frame iron 51 at 123 and has a handle end 124 that is swingable outward from the casing of the machine. Lever 122 has an internally extended end swingable in a path to impellingly engage with stud 117 to force the latter, against the tension in power spring 125, from its broken line position to its full line position in FIG. 7.

Spring 125 is anchored to the upright corner iron 52 of the frame. When spring 125 has been fully tensioned the rod 118 is automatically retained under such tension in its full line position in FIGS. 7 and 8 by the dropping of a detent arm 126 into a notch 127 cut diagonally crosswise in the top of the rod 118. Detent arm 126 is pivotally mounted on the rim iron 51 of the body frame at 130 and its swinging is guided relatively thereto by a bracket 131. Arm 126 carries a handle 132 outside the body casing of the machine for lifting the detent arm 126 and permitting power spring 125 to "fire" the cocked bed plate 29 from its full line position to it broken line position in FIG. 7. Bracket 131 positively restrains the detent arm 126 from yielding to the thrust of power spring 125 that is imposed on rod 118 when the notch therein is engaged by the detent arm.

The method of this invention can be carried out with or without operation of the apparatus hereinbefore described. If used, the apparatus may be operated as follows:

Production of dough blanks

With the cabinet cover 13 held open by the yieldable stays 10 as in FIG. 1 a sheet of dough 68 is laid flat on the stationary die plate 63 so as to cover all of the die apertures 64 therein. Next the cover 13 is lowered into closed position and becomes automatically locked in such position by the latch member 92 which engages the cover carried catch 93 as in FIG. 1a. Also by merely closing the cover the lateral studs 22 which are carried by the punch plate 18 have been brought into hooked engagement with the top ends of the draw links 83, respectively, so that the latter can pull the punch plate downward and shear blanks of dough 65 from the sheet 68 while the cover 13 is held closed by latch 92.

After the cover is closed the plate 18 and its carried punches 19 are pulled downward by manually depressing the foot pedal 72 at the front of the apparatus casing. This swings the bail 73 downward by overcoming the yielding upward pull of springs 75 and causes a dough cutting stroke of the punch plate 18 while the latter is guided by the cover frame posts 43. The punched out dough blanks 65 are thereby deposited respectively at the folding stations 55 on the slidable bed plate 59, after which pedal 72 is released for automatic return to its uppermost position permitting springs 46 to restore the punch plate 18 to its uppermost position in the cover.

Deposition of filler ingredient

While the cover still remains closed an operation is next performed manually which deposits simultaneously on each of the dough blanks 65 a charge 66 of filler ingredient with the assistance of those parts of the apparatus shown in FIGS. 3 to 7, inclusive, and FIGS. 9 to 12, inclusive. To accomplish this the screw handle 37 is given a partial turn in a direction to force the piston plate 25 downward sufficiently to extrude from the pan 21 measured charges 66 of the filler ingredient simultaneously onto the dough blanks 65 through passageways 27, 20 and 28 in each of the punches 19. The quantity of each measured charge can be visually gaged by observing the size of the gob of ingredient that is extruded to the top of grommet 32 in the pilot cup 42' as hereinbefore described.

Folding the dough blank to wrap the filler

The first fold of the dough blanks 65 is shown in FIG. 9 where the left end portion of the blank that overlies the bed plate aperture 100 has been flipped clockwise so as to overlap the charge of filler ingredient 66. This operation is performed rapidly by momentary actuation and release of the push button switch 110 which energizes the solenoid 111 which simultaneously swings all of the flipper arms 96 smartly by the motion transmitting medium of the pitman 105 and all of the crank arms 107 on their shafts 98.

The second fold of the dough blanks 65 is shown in FIG. 10 where the right end portion of the blank that overlies the bed plate aperture 101 has been flipped counterclockwise to overlap not only the filler charge 66 but also the previous filler overlapping fold of the dough blank. This operation is performed rapidly by momentary actuation and release of the push button switch 112 which energizes the solenoid 108 and simultaneously swings all of the flipper arms 97 smartly through the motion transmitting medium of pitman 106 and all of the crank arms 113 on their shafts 99.

Discharging the folded pastry blanks

The pastry blanks 65, herein termed dough blanks before they have become folded, are now resting at the respective folding stations 55 on the bed plate 59. Obliquely adjacent to these stations are situated the drop-out apertures 60 in the bed plate. The bed plate at this time is held cocked by the detent lever 126 and thereby held inactive against the tension in power spring 125 while occupying its full line position in FIG. 7 and until it is desired to discharge the pastry blanks from the bed plate. Such discharge is accomplished by merely lifting the detent lever 126 out of the diagonal notch 127 in the slide rod 118 whereupon spring 125 jerks the bed plate very abruptly from its full line position to its broken line position in FIG. 7. Here flange 115 is stopped by encountering the slide bearing 120. The sharpness of the jerking motion is increased by the play of impelling stud 117 in the slot 116 of the flange 115 which enables the spring caused travel of stud 117 to pick up speed before it impacts the end of the slot and thereupon carries the whole bed plate with it. The speed of the discharging stroke of the bed plate is sufficient to avoid carrying the pastry blanks with it wherefore the blanks remain stationary because of their static inertia while the discharge apertures 60 shift to positions to respectively underlie the blanks as illustrated in FIG. 13.

Now the pastry blanks all fall automatically and simultaneously through the discharge apertures and onto the bake pan 128 that underlies the bed plate. Pan 128 can then be removed from the cabinet through the opening 129 and transferred to a bake oven (not shown). Preferably the lengthwise side-to-side dimension of opening 129 is sufficiently oversize in relation to the width of the pan 128 to permit the latter if desired to be shifted edgewise laterally on its supporting shelf 13 after having received one batch of pastry blanks a proper distance to then receive a second patch of similarly spaced blanks in positions interspersed between the blanks of the first received batch so that double the quantity of blanks in said first received batch can be transferred to a bake oven in the same pan.

The pastry blank discharging action is illustrated with respect to a single folding station 55 and its adjacent discharge aperture 60 in FIG. 13 wherein the article of pastry 65, shown in FIG. 14 as filled, folded and ready for baking, is about to fall through the discharge aperture in the broken line position of the latter. In FIG. 13 the lozenger shape delineated by broken lines represents the shape of the flat dough blank 65 before it became folded.

Within the teaching of this disclosure many departures may be made from the particular kind of apparatus herein illustrated to explain the invention and hence where details of the disclosed apparatus are not specified, the appended claims are to be interpreted as intended to cover all equivalents of the apparatus claimed which would be obvious to those skilled in the art from the disclosure herein.

What is claimed is:

1. A method of folding toward each other opposite marginal portions of a flat dough blank into overlapping relation to the remainder of said blank and to each other whereby to form a doubly folded Danish type pastry blank preliminary to the baking thereof which comprises the steps of, placing the flat dough blank on a plate having a pair of apertures in such position relative to said apertures that said opposite marginal portions thereof respectively bridge said apertures, reaching first through one of said apertures and then through the other of said apertures from positions beneath said apertures in a manner successively to poke said marginal portions upward and toward each other in curved paths of flexure such that one of said marginal portions assumes an overlapping relationship to the other of said marginal portions and to the unfolded portion of the blank, and jerking said plate edgewise out from under said dough blank resting thereon with sufficient abruptness to leave said blank substantially unmoved until gravity causes said blank to drop to below said plate for lack of support thereby.

2. A method of folding toward each other opposite marginal portions of a flat dough blank into overlapping relation to the remainder of said blank and to each other whereby to form a doubly folded Danish type pastry blank preliminary to the baking thereof which comprises the steps of, placing the flat dough blank on a plate having a pair of apertures in such position relative to said apertures that said opposite marginal portions thereof respectively bridge said apertures, reaching first through one of said apertures and then through the other of said apertures from positions beneath said apertures in a manner successively to poke said marginal portions upward and toward each other in curved paths of flexure such that one of said flexed marginal portions assumes an overlapping relationship to the other of said marginal portions and to the unfolded portion of the blank, in which the said folding of said marginal portions of said dough blank is preceded by the step of depositing on said blank between said opposite marginal portions thereof a measured quantity of filler ingredient, and is followed by the step of jerking said plate edgewise out from under said ingredient carrying dough blank with sufficient abruptness to leave said blank substantially unmoved until gravity causes said blank to drop to below said plate for lack of support thereby.

3. Apparatus for producing simultaneously from a sheet of dough a quantity of filler enfolding pastry blanks for baking into Danish type pastries comprising in combination,
  (a) an enwise shiftable table including a bed plate affording folding stations,
  (b) a gang of operatively united dough cutting punches,
  (c) a die plate underlying said punches containing die apertures above said folding stations in register respectively with said punches, whereby a stroke of said punches in unison cuts dough blanks from said sheet of dough and discharges said blanks downward through said die apertures to said folding stations,
  (d) means to deposit individual charges of a filler ingredient on said blanks while the latter rest on said bed plate at said folding stations,
  (e) a flipper mechanism at each of said folding stations including arms supported on said shiftable table in a manner to be movable relatively to said bed plate in paths operative to fold a marginal portion of each of said dough blanks into overlapping relation to an unfolded portion of the blank, thereby to sandwich said filler ingredient within the folded blank,
  (f) and means to discharge said folded dough blanks from said bed plate simultaneously in condition to be baked.

4. Apparatus as defined in claim 3, in which the said means to deposit the said individual charges of a filler ingredient comprise a chamber of variable size adapted to be filled with said ingredient and containing ingredient dispensing outlets located directly over the said folding stations respectively, and means to reduce the size of said chamber to an extent to squeeze said ingredient downward out of said chamber through said outlets.

5. In apparatus for preparing simultaneously a quantity of dough blanks for baking into Danish type pastries, the combination of, a dough blank processing edgewise shiftable table including a bed plate affording folding stations adapted to support spaced apart dough blanks respectively and containing an aperture at each of said folding stations, a flipper mechanism at each of said folding stations including a folder arm pivotally carried by said table in swingable relation to said bed plate in a manner to swing upward through said aperture in an arcuate path, a shaft rotatably supported on said table having said folder arm fixed thereon, a crank arm fixed on said shaft, and a pitman mounted on said table in a manner to perform lengthwise reciprocative movement relative thereto operatively engaged with said crank arm in a manner to cause the latter to turn said shaft whereby to swing said folder arm in its said arcuate path.

6. In apparatus as described in claim 5, the combination defined in said claim, together with an electric solenoid having an armature reciprocative in a rectilinear path operatively engaged with said pitman in a manner to impel the latter in an arcuate path.

7. In apparatus as described in claim 5, the combination defined in said claim, in which there are two of the said shafts each having a crank arm fixed thereon, the said pitman being operatively engaged with a plurality of the said crank arms in a manner to cause said shafts to rotate simultaneously.

8. In apparatus for preparing simultaneously a quantity of dough blanks for baking into Danish type pastries, the combination of, a dough blank processing edgewise shiftable table including a bed plate affording folding stations adapted to support spaced apart dough blanks respectively and containing discharge apertures adjacent said folding stations, a flipper mechanism at each of said folding stations including arms supported on said shiftable table in a manner to be movable relatively to said bed plate in directions to wipe and fold a marginal portion of each of said dough blanks into overlapping relation to an unfolded portion of said blank, and means supporting said shiftable table for a predetermined extent of edgewise sliding movement operative to shift said discharge apertures from an original position to a displaced position just previously occupied by said folding stations respectively.

9. In apparatus as described in claim 8, the combination defined in said claim, together with a cock-and-fire mechanism operatively arranged to cause the said edgewise sliding movement of the said bed plate with sufficient abruptness to leave the said folded dough blanks unmoved at the said folding stations during said sliding movement of the bed plate, whereby said blanks can drop through the said shifted discharge apertures simultaneously.

10. In apparatus as described in claim 9, the combination defined in said claim in which the said cock-and-fire mechanism comprises a firing spring constantly urging the said bed plate in the direction of its said edgewise sliding movement, a leverage applying handle arranged to force said bed plate in the opposite direction to a cocked position against the opposition of said spring, and a detent device shiftable to and from a position to stay said bed plate against movement responsive to the urge of said spring, together with a handle operatively connected to shift said detent device to release said bed plate to the firing action of said spring.

11. In apparatus for dispensing filler ingredient from a supply thereof onto a flat blank of dough preparatory to enfolding said ingredient within said blank, the combination of, a plate having a plurality of die apertures delineating blanks of dough, a plurality of punches ganged to conform respectively to said die apertures and to perform dough cutting strokes through said apertures respectively and in unison whereby to cut said blanks from a sheet of dough each of said punches having a passageway therethrough communicating with a common supply of ingredient in a manner to direct said ingredient through said passageways onto said dough blanks, a pan having discharge outlets adapted to contain said supply of filler ingredient, an extruder plate movable within said pan in a direction to force said ingredient downward out of said pan and through said passageways in said punches onto said dough blanks, and means selectively to impel said extruder plate manually in said direction.

12. In apparatus as described in claim 11, the combination defined in said claim, together with a sight gage mounted on the said extruder plate in a manner to be commensurably sentitive to the amount of the said filler ingredient forced out of the said discharge outlets in the said pan by movement of said extruder plate.

13. In apparatus as described in claim 12, the combination defined in said claim in which the said sight gage comprises a cup having therewithin the elevated head of a conduit providing flow communication between the interior of said cup and the said supply of filler ingredient in the said pan, whereby extruding compression of said supply of ingredient by the said extruder plate causes an amount of said ingredient to rise in said conduit and become visible on the said conduit head.

References Cited

UNITED STATES PATENTS

| | | | |
|---|---|---|---|
| 163,332 | 5/1875 | Ruger et al. | 107—4 |
| 707,062 | 8/1902 | Heineman | 222—197 |
| 1,373,796 | 4/1921 | Cardone et al. | 107—8.8 |
| 2,574,548 | 11/1951 | Deutsch | 107—9 |
| 3,257,973 | 6/1966 | Schafer | 107—9 |

FOREIGN PATENTS 38,768  8/1936  Netherlands.

BILLY J. WILHITE, *Primary Examiner.*

J. SHEA, *Assistant Examiner.*